(12) United States Patent
Jones et al.

(10) Patent No.: US 10,810,289 B2
(45) Date of Patent: Oct. 20, 2020

(54) APPARATUSES, SYSTEMS, AND METHODS FOR PROVIDING ACCESS SECURITY IN A PROCESS CONTROL SYSTEM

(71) Applicant: FISHER-ROSEMOUNT SYSTEMS, INC., Round Rock, TX (US)

(72) Inventors: Aaron C. Jones, Round Rock, TX (US); Andrew E. Cutchin, Killeen, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 155 days.

(21) Appl. No.: 15/236,688

(22) Filed: Aug. 15, 2016

(65) Prior Publication Data

US 2018/0046790 A1    Feb. 15, 2018

(51) Int. Cl.
| | |
|---|---|
| *G06F 21/00* | (2013.01) |
| *G06F 21/32* | (2013.01) |
| *G06F 16/635* | (2019.01) |
| *G06F 16/683* | (2019.01) |
| *G06K 9/00* | (2006.01) |
| *G05B 19/409* | (2006.01) |

(52) U.S. Cl.
CPC ........... *G06F 21/32* (2013.01); *G05B 19/409* (2013.01); *G06F 16/636* (2019.01); *G06F 16/683* (2019.01); *G06K 9/00288* (2013.01); *G06K 9/00335* (2013.01); *G06K 9/00362* (2013.01); *G05B 2219/24162* (2013.01); *G05B 2219/34282* (2013.01); *Y04S 40/24* (2013.01)

(58) Field of Classification Search
CPC ........ G05B 19/409; G05B 2219/34282; G06F 17/30743; G06F 17/30764; G06F 21/32; G06F 21/36; G06F 3/01; G06K 9/00288; G06K 9/00335; G06K 9/00; H04L 63/0861; H04W 12/06; G06T 7/20
See application file for complete search history.

(56) References Cited

U.S. PATENT DOCUMENTS

| | | | |
|---|---|---|---|
| 2005/0038565 A1 | 2/2005 | Power et al. | |
| 2006/0059365 A1* | 3/2006 | Harper | G06F 21/6245 713/186 |
| 2006/0136743 A1* | 6/2006 | Polcha | G06F 21/32 713/186 |
| 2006/0143469 A1 | 6/2006 | Schmidt et al. | |
| 2006/0163344 A1* | 7/2006 | Nwosu | G06Q 20/105 235/380 |
| 2009/0116703 A1* | 5/2009 | Schultz | G06F 21/32 382/118 |

(Continued)

OTHER PUBLICATIONS

Search Report for Application No. GB1712628.5, dated Jan. 31, 2018.

*Primary Examiner* — Joseph P Hirl
*Assistant Examiner* — Ka Shan Choy
(74) *Attorney, Agent, or Firm* — Marshall, Gerstein & Borun LLP

(57) ABSTRACT

Apparatuses, systems, and methods of the present disclosure may provide access security in a process control system. For example, current biometric data representative of a user may be acquired and compared to stored biometric data representative of previously identified users. Access to the process control system may be authorized when the current biometric data matches stored biometric data.

33 Claims, 5 Drawing Sheets

(56) References Cited

U.S. PATENT DOCUMENTS

| | | |
|---|---|---|
| 2009/0320125 A1 | 12/2009 | Pleasant, Jr. et al. |
| 2010/0275258 A1* | 10/2010 | Kamakura ............... G06F 21/32 |
| | | 726/19 |
| 2011/0022195 A1 | 1/2011 | Plache et al. |
| 2011/0224808 A1 | 9/2011 | Lucas et al. |
| 2013/0307670 A1* | 11/2013 | Ramaci ............... G06F 21/6245 |
| | | 340/5.82 |
| 2014/0132393 A1* | 5/2014 | Evans .................... G08B 21/02 |
| | | 340/6.11 |
| 2015/0046697 A1 | 2/2015 | Galpin et al. |
| 2015/0220931 A1* | 8/2015 | Alsina .................... G06Q 20/12 |
| | | 705/44 |
| 2015/0227734 A1* | 8/2015 | Mucci .................... G06F 21/32 |
| | | 726/19 |
| 2016/0241552 A1* | 8/2016 | Lindemann ............. G06F 21/32 |
| 2016/0308859 A1* | 10/2016 | Barry .................. H04L 63/0861 |
| 2016/0335511 A1* | 11/2016 | MacDonald ....... G06K 9/00335 |
| 2017/0213213 A1* | 7/2017 | Tomlinson, Jr. ..... G06Q 20/401 |
| 2017/0318014 A1* | 11/2017 | Korus ................. H04L 63/0861 |
| 2017/0372049 A1* | 12/2017 | Tieu ........................ G06F 21/36 |
| 2018/0004925 A1* | 1/2018 | Petersen ................ G06F 21/32 |
| 2018/0020350 A1* | 1/2018 | Vissa .................... H04W 12/06 |
| 2018/0052521 A1* | 2/2018 | Kamiya .................. G06F 3/017 |

\* cited by examiner

APPARATUSES, SYSTEMS, AND METHODS FOR PROVIDING ACCESS SECURITY IN A PROCESS CONTROL SYSTEM

TECHNICAL FIELD

The present disclosure generally relates to process control system access security. More particularly, the present disclosure relates to process control system access security based on biometric data.

BACKGROUND

Checking and enforcing user authorization to access a process control system typically makes up a large part of an associated security architecture. In process plant operator applications, system access is typically authenticated each time a user attempts to interact with the process control system. In a typical implementation, the user logs into the system and corresponding user credentials are cached and stored until the user logs out and another user logs in.

With electronic signature (ESIG) policies, authorization to access a system can be more complex. For example, a login and password may need to be entered every time the user attempts access. Even more onerous, two user logins and passwords may be required. Systems like this can suffer from several problems: 1) if a user walks away without logging out, someone else may perform actions as this person, 2) user passwords may be hacked, stolen, or forgotten, thus, additional password security (complexity, frequency of change, etc.) may complicate this further, 3) entering credentials is often slow, repetitive, and painful—when requiring two signatures for ESIG, this is even more onerous.

Associated system log-ins often require serial entry and there is time overhead associated with changing entry blocks to type corresponding entries. This can lead users who are not legally required to use system access authorization, to turn the secure features off to avoid hassle.

What are needed are apparatuses, methods and systems to improve known process control system access security.

SUMMARY

A method for operating a process control system for a process plant may include capturing, via a sensor at a user-interface, biometric data of a user authorized to interact with the process control system. The method may also include comparing the captured biometric data to stored data of users that are authorized to interact with the process control system, and determining an identity of a user based on a match between the captured biometric data and the stored data. The method may further include providing the user access to the process control system when the identity of the user is determined.

In another embodiment, a system for operating a process control system for a process plant may include a communication network, one or more processors communicatively coupled to the communication network, and a non-transitory computer-readable memory coupled to the one or more processors and storing thereon instructions. The instructions, when executed by the one or more processors, may cause the system to capture, via a sensor at a user-interface, biometric data of a user authorized to interact with the process control system. The instructions, when executed by the one or more processors, may cause the system to further compare the captured biometric data to stored data of users authorized to interact with the process control system, and determine an identity of a user based on a match between the captured biometric data and the stored data. The instructions, when executed by the one or more processors, may cause the system to also provide the user access to the process control system when the identity of the user is determined.

In a further embodiment, a tangible, computer-readable medium may store instructions that when executed by one or more processors of a process control system, cause the process control system to capture, by one or more sensors, biometric data of a user associated with a process of the process control system and determine, by the one or more processors, a level of authorization of the user based on the captured biometric data. When further executed by the one or more processors of the process control system, the instructions may cause the process control system to provide the user access to the process control system when the identity of the user is determined.

In yet a further embodiment, a system for operating a process control system for a process plant may include a communication network, one or more processors communicatively coupled to the communication network; and a non-transitory computer-readable memory coupled to the one or more processors and storing thereon instructions that, when executed by the one or more processors, cause the system to capture, via a sensor at a user-interface, first biometric data of a first user authorized to interact with the process control system. Execution of the instructions by the processor may also cause the system to compare the first biometric data to stored data of users authorized to interact with the process control system, determine an identity of the first user based on a match between the first biometric data and the stored data. Execution of the instructions may further cause the system to cause the system to capture, via a sensor at a user-interface, second biometric data of a second user authorized to interact with the process control system, and determine an arrangement of one or more limbs or a voice signature of the second user based on the second biometric data, and provide an output signal, comprising an electronic signature of the second user, based on the determined arrangement. Execution of the instructions by the processor may further cause the system to provide the first user access to the process control system, based on the output signal, when the identity of the first user is determined.

DETAIL DESCRIPTION

Figure 1:
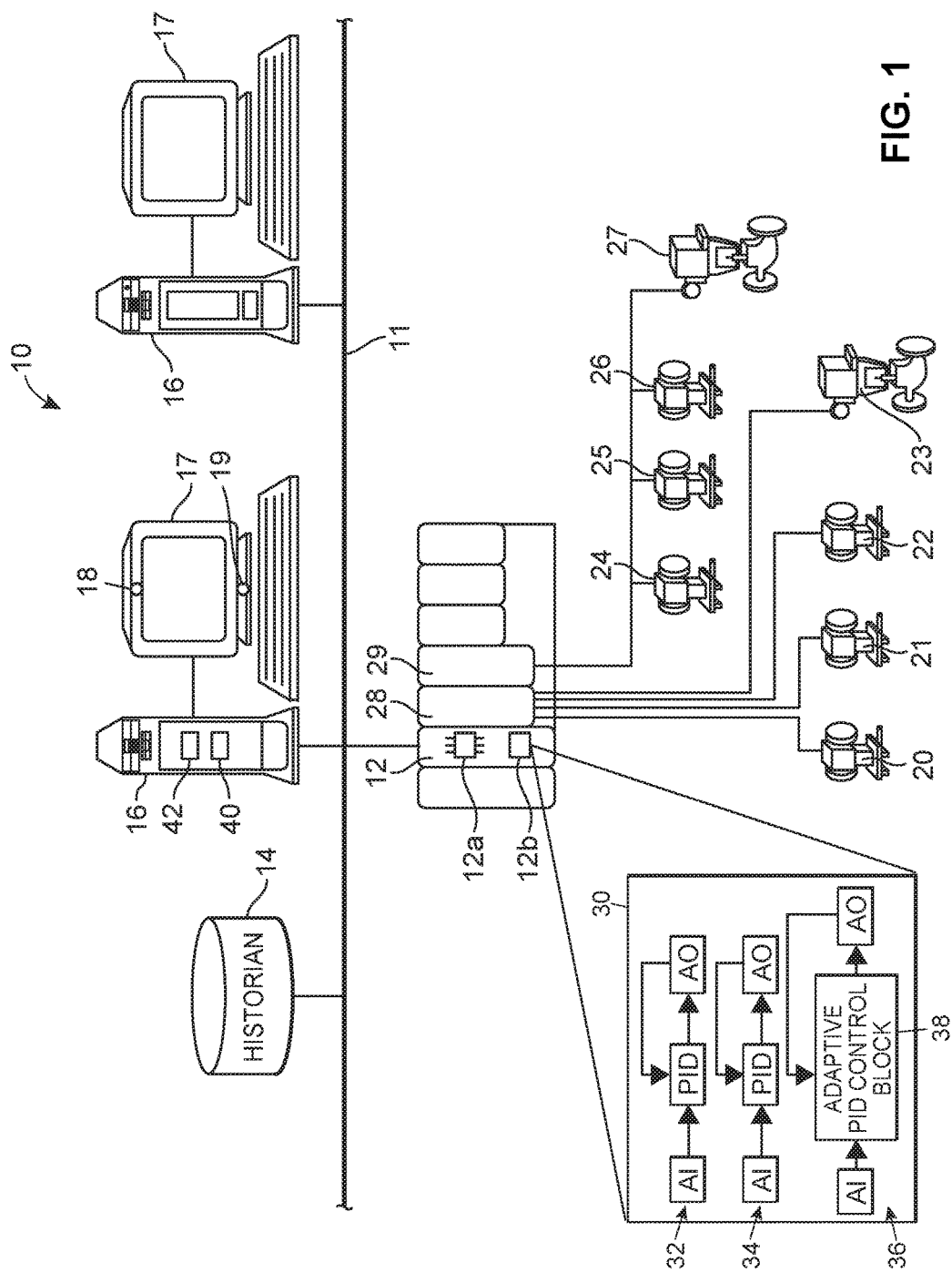
FIG. 1 depicts a block diagram of an example process control system including access security.

Apparatuses, methods and systems of the present disclosure may employ a camera and facial and/or gesture recognition technology. For example, associated process control access security systems may be trained to recognize a person standing in front of an associated camera.

More broadly, a biometric device (e.g., a camera, a fingerprint scanner, a microphone) and an associated computer may be employed to acquire and store previously classified biometric data. The previously classified biometric data may be representative of process control system users that have been verified to be authorized to access an associated process control system, or a portion thereof. Subsequently, when an individual attempts to perform a secured operation, the biometric device may acquire current biometric data and an associated computing device may compare the current biometric data to the previously classified biometric data to determine if the individual is an authorized user. For audit purposes, the current biometric data (e.g., an image, a fingerprint, a voice recording, etc.) of the individual may be saved as a record of which user accesses the process control system.

Accordingly, when a user walks away from, for example, a process control system workstation and another user attempts to access the workstation, an associated process control system security apparatus may automatically determine that the user had changed. Thus, there may be no risk of the wrong credentials being used in association with a performed action.

A biometric data based security verification method of the present disclosure may be used as a replacement of known login sessions, or a known login session may be combined with manual credential information forgone and replaced with biometric data based security access. In other words, biometric data based security access of the present disclosure may be combined with known manual login security to provide an additional layer of security.

Given that biometric data associated with a user may replace an associated username/password, associated username/password rules and/or issues may be eliminated.

For process control system security that requires an electronic signature (ESIG), gesture recognition may be employed as a form of a biometric data based security system. For example, a gesture may be defined as a temporary static pose of a limb (e.g., an arm, a hand, a finger, etc.) of a user. Accordingly, in an ESIG system, a differentiation may be made between a confirmer and verifier (i.e., using DeltaV Batch terms). In particular, a gesture may be used where a confirmer raises, for example, an arm, a hand, or a finger whenever the associated individual wished to access a given process control system. Alternatively, with addition of a sound recording device (e.g., a microphone), a voice print may be used to generate biometric data. When a differentiation must be made between users, a confirmer may speak the word, for example, "confirm."

Biometric data based security of the present disclosure may be incorporated with other security technologies for further increased security. For example, host intrusion detection (HID) badges or visual based badges with camera image processing software (e.g., Microsoft Kinect, Microsoft Kinect application programming interface (API), etc.) may be used as an additional token of proof of identity. Alternatively, facial and/or gesture recognition may be implemented in a proprietary fashion, or using other existing off-the-shelf technologies.

In any event, biometric data based security apparatuses, methods and systems of the present disclosure may provide more secure login compared to known security access, may allow more efficient login compared to known security access, may lesson access requirements and allow for more secure defaults, and may reduce human error and allow multiple users to share a set of process control system computers (e.g., workstations, user interfaces, etc.). Accordingly, process control system users may be able to move between process control system access devices without risk of using wrong credentials.

Turning to FIG. 1, a process control system 10 for use in controlling, for example, an industrial process (e.g., a refinery, a drug manufacturing process, a power plant, etc.) may include a process controller 12 connected to a data historian 14 and to one or more host workstations or computers 16 via a communications network 11. The host workstations or computers 16 may include a first biometric device 18 (e.g., a digital camera, a fingerprint scanner, a microphone, etc.) and a second biometric device 19 (e.g., a digital camera, a fingerprint scanner, a microphone, etc.). The data historian 14 may store, for example, previously classified biometric data. The previously classified biometric data may be representative of an identity of at least one individual that has been authorized to access the process control system 10. Biometric data based security of the present disclosure may be employed to verify and authorize user access to any of the devices illustrated in FIG. 1. Moreover, biometric data based security of the present disclosure may be employed to limit access to process control system 10 configuration, monitoring and/or control to only authorized individuals.

The host workstations or computers 16 may be any type of personal computers, workstations, etc., each having a display screen 17. The controller 12 may also be connected to field devices 20-27 via input/output (I/O) cards 28 and 29. The communications network 11 may be, for example, an Ethernet communications network or any other suitable or desirable communications network. The data historian 14 may be any desired type of data collection unit having any desired type of memory and any desired or known software, hardware or firmware for storing data. The controller 12, which may be, by way of example, a DeltaV™ controller or ER5000 controller sold by Emerson Process Management, may be communicatively connected to the field devices 20-27 using any desired hardware and software associated with, for example, standard 4-20 mA devices and/or any smart communication protocol such as the FOUNDATION® Fieldbus protocol, the HART® protocol, etc.

The field devices 20-27 may be any type of process devices, such as sensors, valves, regulators, transmitters, positioners, etc. which perform a physical function within the process and/or which measure a process variable. The I/O cards 28 and 29 may be any types of I/O devices conforming to any desired communication or controller protocol. In the embodiment illustrated in FIG. 1, the field devices 20-23 may be standard 4-20 ma devices that communicate over analog lines to the I/O card 28, or may be HART devices that communicate over combined analog and digital lines to the I/O card 28. The field devices 24-27 may be smart devices, such as Fieldbus field devices, that communicate over a digital bus to the I/O card 29 using Fieldbus protocol communications. Generally, the Fieldbus protocol may be an all-digital, serial, two-way communication protocol that provides a standardized physical interface to a two-wire loop or bus which interconnects field devices. The Fieldbus protocol may provide, in effect, a local area network for field devices within a process, which may enable the field devices to perform process control functions using, for example, function blocks (e.g., PID function blocks) defined according to the Fieldbus protocol, at locations distributed throughout a process facility, and to communicate with one another before and after performance of these process control functions to implement an overall control strategy. Alternatively, or additionally, the field devices 20-27 may conform to any other desired standards or protocols, including any wired or wireless standards or protocols, and any protocols now existing or developed in the future.

The controller 12 may include a processor 12a that may implement or executes one or more process control routines (e.g., modules), which may include control loops (e.g., PID loops) or portions of control loops, stored in a computer readable memory 12b, and may communicate with the devices 20-27, the host computers 16 and/or the data historian 14 to control a process in any desired manner.

It should be noted that any of the control routines or elements described herein may have parts thereof implemented or executed by processors in different controllers or other devices, such as in one or more of the field devices 20-27 if so desired. Likewise, the control routines or elements described herein to be implemented within the process control system 10 may take any form, including software, firmware, hardware, etc. A process control element can be any part or portion of a process control system including, for example, a routine a block or a module stored on any computer readable medium. Control routines, which may be modules or any part of a control procedure, such as a subroutine, parts of a subroutine (e.g., lines of code), etc. may be implemented in any desired software format, such as using ladder logic, sequential function charts, function block diagrams, or any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. As a result, it will be understood that the controller 12 may be configured to implement a control strategy or a control routine in any desired manner.

The controller 12 may implement a control strategy using what are commonly referred to as function blocks, wherein each function block is a part (e.g., a subroutine) of an overall control routine, and may operate in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve or a regulator, to perform some physical function within the process control system 10. Hybrid and other types of function blocks exist. Function blocks may be stored in and executed by the controller 12, which is typically the case when these function blocks are used for, or are associated with standard 4-20 ma devices and some types of smart field devices such as HART and Fieldbus devices. Alternatively, or additionally, the function blocks may be stored in and implemented by the field devices themselves, which can be the case with some types of Fieldbus devices. While the description of the control system is provided herein using a function block control strategy, the control strategy or control loops or modules could also be implemented or designed using other conventions, such as ladder logic, sequential function charts, etc. or using any other desired programming language or paradigm.

As illustrated by the exploded block 30 of FIG. 1, the controller 12 may include a number of control loops 32, 34 and 36, with the control loop 36 being illustrated as including an adaptive control routine or block 38. Each of the control loops 32, 34 and 36 is typically referred to as a control module. The control loops 32, 34 and 36 are illustrated as performing single loop control using a single-input/single-output PID control block connected to appropriate analog input (AI) and analog output (AO) function blocks, which may be associated with process control devices such as valves, with measurement devices such as temperature and pressure transmitters, or with any other device within the process control system 10. In the example system of FIG. 1, the adaptive control loop 36 includes the adaptive PID control block 38 which operates to adaptively determine and provide tuning parameters to a typical PID routine to adapt operation of the PID control routine during the on-line operation of the control loop 36 when controlling a process, e.g., when controlling the operation of a process using valves and/or other control devices which control a physical parameter of the process, based on measurement signals, such as sensor signals, which are indicative of measured or sensed parameters of the process. While the control loops 32, 34 and 36 are illustrated as performing PID control having an input communicatively connected to one AI function block and an output communicatively connected to one AO function block, the control loops 32, 34 and 36 could include more than a single input and a single output, and the inputs and outputs of these control loops may be connected to any other desired function blocks or control elements to receive other types of inputs and to provide other types of outputs. Moreover, the adaptive control block 38 may implement other types of control strategies, such as PI control, PD control, neural network control, fuzzy logic control, model predictive control or any type of feed forward/feedback control technique.

It shall be understood that the function blocks illustrated in FIG. 1, such as the PID function blocks and the adaptive PID function block 38, which itself can be implemented as one or more interconnected function blocks, can be executed by the controller 12 or, alternatively, can be partially or entirely located in and executed by any other suitable processing device(s), such as one of the workstations 16, one of the I/O devices 28 and 29, or even one of the field devices 24-27.

As illustrated in FIG. 1, one of the workstations 16 may include one or more adaptation support routines which are used to design, control, implement and/or view the adaptive control block 38 or the control loop 36. For example, the workstation 16 may include a processor 40 that may generate, for example, a user interface that enables a user to input parameters to the adaptive PID control block 38, to start, stop and control the functioning of the adaptive control loop 36 or the blocks thereof, to provide set points and other adjustments to the control block 38, etc. Still further, the workstation 16 may include a routine or a block 42 that, when executed by the processor 40, provide process control system access security based on biometric data.

Figure 2:
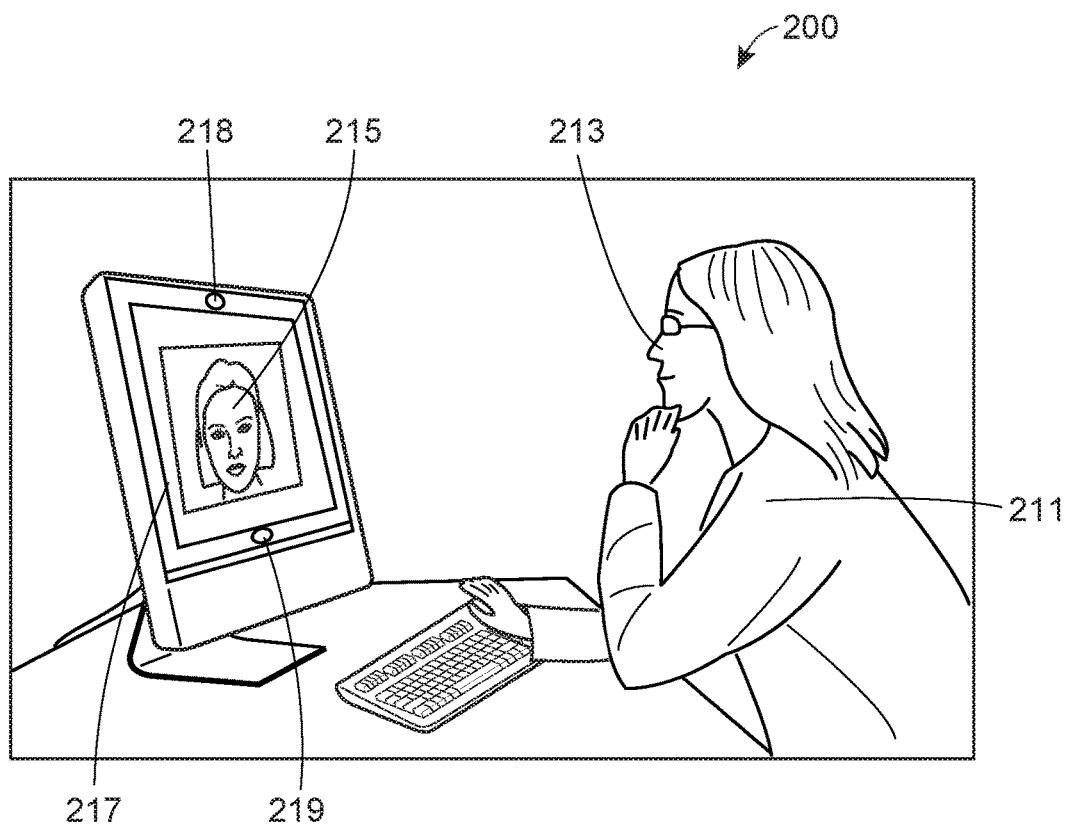
FIG. 2 depicts an example process control system workstation including access security.

With reference to FIG. 2, a process control system 200 may include a workstation 217 having a first biometric device 218 (e.g., a digital camera, a fingerprint scanner, a microphone, etc.) and a second biometric device 219 (e.g., a digital camera, a fingerprint scanner, a microphone, etc.). The workstation 217 may be similar to, for example, either of the host workstations or computers 16 of FIG. 1.

In any event, when an individual 211 attempts to access the process control system 200, current biometric data may be automatically acquired via the first biometric device 218 and/or the second biometric device 219. For example, current biometric data 215 may be representative of at least a portion 213 (e.g., a face, an arm, a hand, a finger, a voice signature, a gesture) of the individual 211. The workstation 217 may automatically compare the current biometric data 215 to previously classified biometric data (e.g., previously classified biometric data stored in the data historian 14 of FIG. 1). If the workstation 217 determines that the current biometric data 215 matches previously classified biometric data stored in the data historian 14, the workstation 217 may automatically authorize the individual 211 access to the process control system 200. On the other hand, if the workstation 217 determines that the current biometric data 215 does not match previously classified biometric data stored in the data historian 14, the workstation 217 may automatically deny the individual 211 access to the process control system 200. In either event, the workstation 217 may store the current biometric data 215 (along with a day/time stamp) as a record of the authorization or denial.

Figure 3:
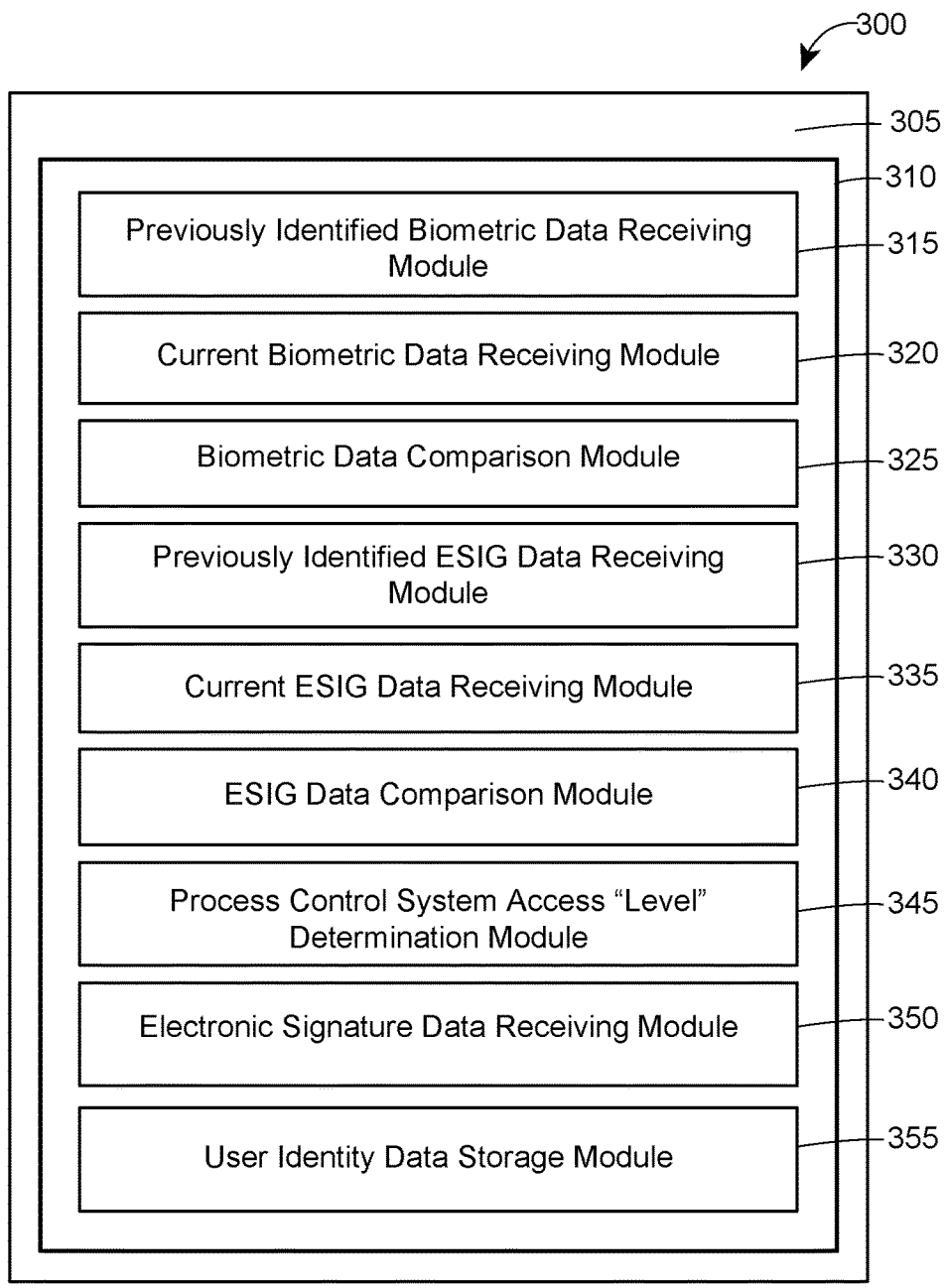
FIG. 3 depicts a block diagram of an example process control system workstation including access security.

Turning to FIG. 3, a process control system 300 may include a workstation 305. The workstation 305 may be similar to any one of the workstations or computers 16 of FIG. 1 or the workstation 217 of FIG. 2. The workstation 305 may include a previously identified biometric data receiving module 315, a current biometric data receiving module 320, a biometric data comparison module 325, a previously identified electronic signature (ESIG) data receiving module 330, a current ESIG data receiving module 335, an ESIG data comparison module 340, a process control system access "level" determination module 345, an electronic signature data receiving module 350, and a user identity data storage module 355 stored on a non-transitory computer-readable medium 310 in the form of, for example, computer-readable instructions. The modules 315-355 may be similar to, for example, the routine 42 of FIG. 1.

While the previously identified biometric data receiving module 315, the current biometric data receiving module 320, the biometric data comparison module 325, the previously identified electronic signature (ESIG) data receiving module 330, the current ESIG data receiving module 335, the ESIG data comparison module 340, the process control system access "level" determination module 345, the electronic signature data receiving module 350, and the user identity data storage module 355 may be stored on the non-transitory computer-readable medium 310 in the form of computer-readable instructions, any one of, all of, or any sub-combination of the previously identified biometric data receiving module 315, the current biometric data receiving module 320, the biometric data comparison module 325, the previously identified electronic signature (ESIG) data receiving module 330, the current ESIG data receiving module 335, the ESIG data comparison module 340, the process control system access "level" determination module 345, the electronic signature data receiving module 350, and the user identity data storage module 355 may be implemented by hardware (e.g., one or more discrete component circuits, one or more application specific integrated circuits (ASICs), etc.), firmware (e.g., one or more programmable application specific integrated circuits (ASICs), one or more programmable logic devices (PLDs), one or more field programmable logic devices (FPLD), one or more field programmable gate arrays (FPGAs), etc.), and/or any combination of hardware, software and/or firmware. Furthermore, the workstation 305 of FIG. 3 may include one or more elements, processes and/or devices in addition to, or instead of, those illustrated in FIG. 3, and/or may include more than one of, any, or all of the illustrated elements, processes and devices.

Figure 4:
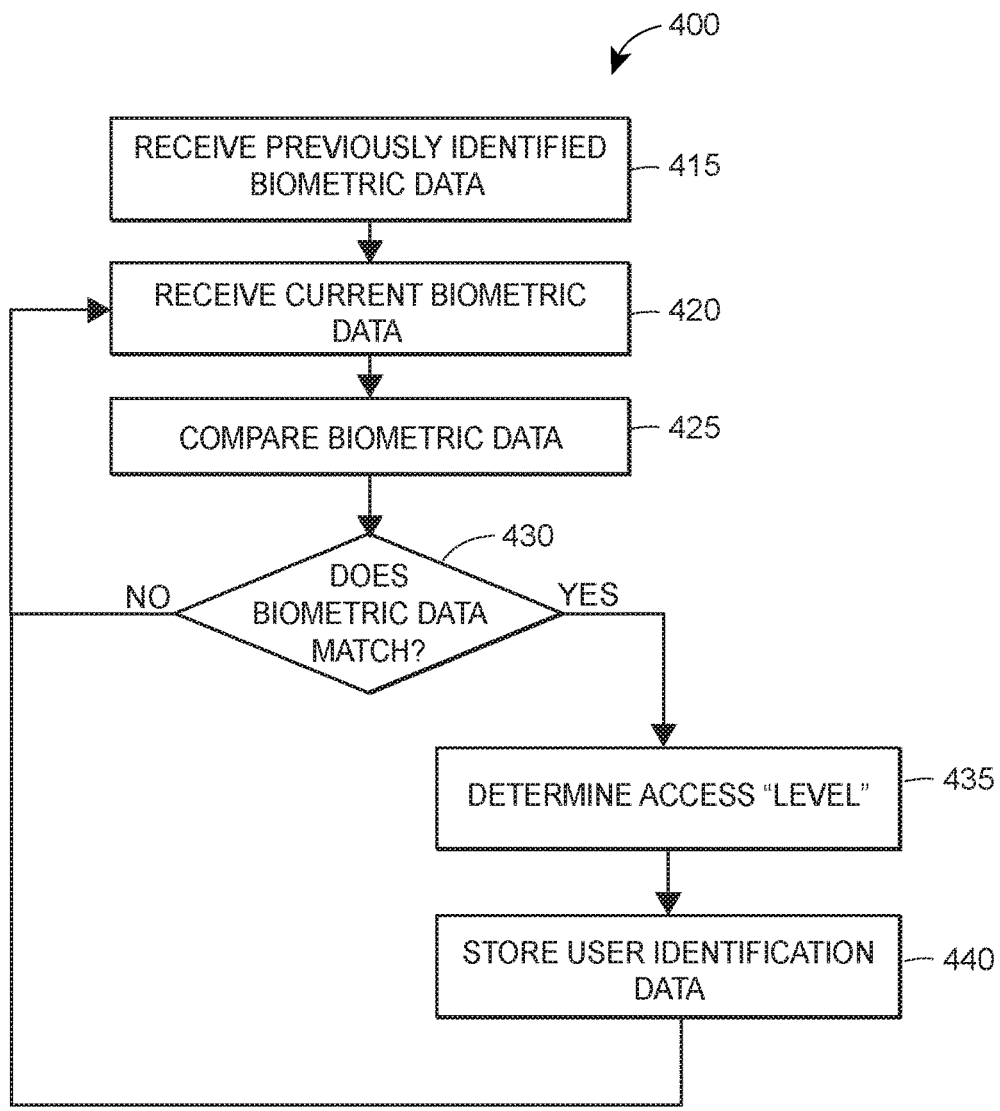
FIG. 4 depicts an example method of providing access security in a process control system.

With reference to FIG. 4, a method of providing access security in a process control system 400 may be implemented by a processor (e.g., a processor 40 of the workstation or computer 16 of FIG. 1) executing, for example, at least a portion of the modules 315-355 of FIG. 3. In particular, the processor 40 may execute a previously identified biometric data receiving module 315 to cause the processor 40 to receive previously identified biometric data (block 415). The previously identified biometric data may be representative of, for example, an identity of at least one individual that is authorized to access a process control system. The previously identified biometric data may be, for example, image data, voice recording data, fingerprint data, gesture data, etc. The processor 40 may receive the previously identified biometric data from, for example, data historian (e.g., data historian 14 of FIG. 1).

The processor 40 may execute a current biometric data receiving module 320 to cause the processor 40 to receive current biometric data (block 420). The current biometric data may be representative of, for example, an identity of at least one individual that is attempting to access a process control system. The current biometric data may be, for example, image data, voice recording data, fingerprint data, gesture data, etc. The processor 40 may receive the current biometric data from, for example, a digital camera, a microphone, a fingerprint scanner, etc.

The processor 40 may execute a biometric data comparison module 325 to cause the processor 40 to compare the current biometric data with the previously identified biometric data (block 425). For example, the processor 40 may determine whether the current biometric data matches the previously identified biometric data (block 430).

When the processor 40 determines that the current biometric data does not match the previously identified biometric data (block 430), the processor 40 may deny the individual access to the process control system, and may once again receive current biometric data (block 420). When the processor 40 determines that the current biometric data matches the previously identified biometric data (block 430), the processor 40 may allow the individual access to the process control system, may execute a process control system access "level" determination module 345 to determine an access "level" for the individual based upon, for example, a role of the individual with respect to an associated process plant (e.g., a supervisor, a manager, an engineer, a plant operator, a maintenance personnel, etc.) (block 435), and may execute a user identity data storage module 355 to cause the processor 40 to store a record that is representative of the individual that is attempting access and/or an associated day/time stamp (block 440). For audit purposes, the current biometric data (e.g., an image, a fingerprint, a voice recording, etc.) of the individual may be saved as a record (or "proof") of, for example, which user accesses the process control system.

As described above, the method 400 may comprise a program (or module) for execution by a processor. The program (or module) may be embodied in software stored on a tangible (or non-transitory) computer readable storage medium such as a compact disc read-only memory ("CD-ROM"), a floppy disk, a hard drive, a DVD, Blu-ray disk, or a memory associated with the personal-identification entry device (PED) processor. The entire program (or module) and/or parts thereof could alternatively be executed by a device other than the PED processor and/or embodied in firmware or dedicated hardware (e.g., one or more discrete component circuits, one or more application specific integrated circuits (ASICs), etc.). Further, although the example program (or module) is described with reference to the flowchart illustrated in FIG. 4, many other methods of implementing the method 400 may alternatively be used. For example, the order of execution of the blocks may be changed, and/or some of the blocks described may be changed, eliminated, or combined.

Figure 5:
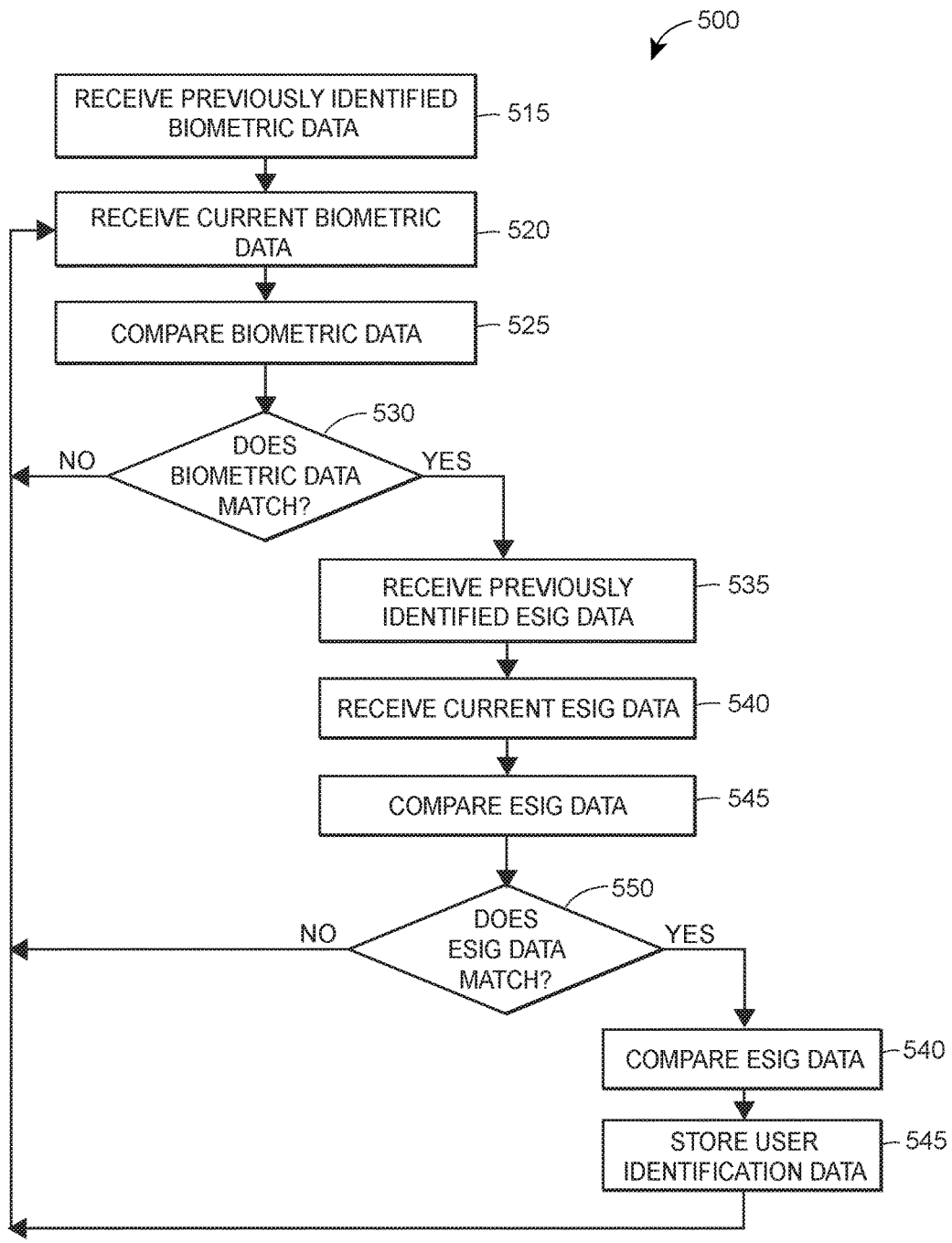
FIG. 5 depicts an example method of providing access security in a process control system.

Turning to FIG. 5, a method of providing access security in a process control system 500 may be implemented by a processor (e.g., a processor 40 of the workstation or computer 16 of FIG. 1) executing, for example, at least a portion of the modules 315-355 of FIG. 3. For process control system security that requires an electronic signature (ESIG), gesture recognition may be employed in accordance with the method 500 as a form of a biometric data based security system. A gesture may be defined, for example, as a temporary static pose of a limb (e.g., an arm, a hand, a finger, etc.) of a first user (e.g., a verifier) and/or a second user (e.g., a confirmer). Accordingly, in an ESIG system, a differentiation may be made between a confirmer and verifier (i.e., using DeltaV Batch terms). In particular, a gesture may be used where a verifier and/or a confirmer may raise, for example, an arm, a hand, or a finger whenever the associated individual wished to access a given process control system. In any event, electronic signatures may be implemented to meet regulatory compliance efforts (e.g., FDA 21 CFR Part 11, OSHA, ISO 9000, etc.).

Alternatively, or additionally, with addition of a sound recording device (e.g., a microphone), a voice print may be used to generate biometric data. Accordingly, when a differentiation is desired between users, a verifier may speak a first word (e.g., verify or verifier) and a confirmer may speak a second word (e.g., confirm or confirmer). The processor 40 may implement voice recognition to identify a first user (e.g., confirmer) and/or a second user (e.g., a verifier). Method 500 may incorporate, for example, action confirm/ verify via electronic signatures from a batch operator interface and campaign manager. Any and all actions undertaken may be set up to require a first user name and password (e.g., a confirmer user name and password) to execute, and second user name and password (e.g., a verifier user name and password).

More particularly, the processor 40 may execute a previously identified biometric data receiving module 315 to cause the processor 40 to receive previously identified biometric data (block 515). The previously identified biometric data may be representative of, for example, an identity of at least one individual that is authorized to access a process control system. The previously identified biometric data may be, for example, image data, voice recording data, fingerprint data, gesture data, etc. The processor 40 may receive the previously identified biometric data from, for example, data historian (e.g., data historian 14 of FIG. 1).

The processor 40 may execute a current biometric data receiving module 320 to cause the processor 40 to receive current biometric data (block 520). The current biometric data may be representative of, for example, an identity of at least one individual that is attempting to access a process control system. The current biometric data may be, for example, image data, voice recording data, fingerprint data, gesture data, etc. The processor 40 may receive the current biometric data from, for example, a digital camera, a microphone, a fingerprint scanner, etc.

The processor 40 may execute a biometric data comparison module 325 to cause the processor 40 to compare the current biometric data with the previously identified biometric data (block 525). For example, the processor 40 may determine whether the current biometric data matches the previously identified biometric data (block 530).

When the processor 40 determines that the current biometric data does not match the previously identified biometric data (block 530), the processor 40 may deny the individual access to the process control system, and may once again receive current biometric data (block 520). When the processor 40 determines that the current biometric data matches the previously identified biometric data (block 530), the processor 40 may execute a previously identified electronic signature (ESIG) data receiving module 330, to cause the processor 40 to receive previously identified ESIG data (block 535). For example, the processor 40 may receive previously identified ESIG data from a data historian (e.g., data historian 14 of FIG. 1). The previously identified ESIG data may be representative of, for example, an identity of at least one individual that has authorization to access the process control system. The previously identified ESIG data may be representative of a gesture (e.g., an arm gesture, a hand gesture, a finger gesture, etc.) that has been previously associated with an individual that is authorized to access the process control system. The processor 40 may execute a current ESIG data receiving module 335, to cause the processor 40 to receive current ESIG data (block 540). The processor 40 may execute an ESIG data comparison module 340 to cause the processor 40 to compare the current ESIG data with the previously identified ESIG data (block 545). For example, the processor 40 may determine whether the current ESIG data matches the previously identified ESIG data (block 550).

When the processor 40 determines that the current ESIG data does not match the previously identified ESIG data (block 550), the processor 40 may deny the individual access to the process control system, and may receive current biometric data (block 520). When the processor 40 determines that the current ESIG data matches the previously identified ESIG data (block 550), the processor 40 may allow the individual access to the process control system, may execute a process control system access "level" determination module 345 to determine an access "level" for the individual based upon, for example, a role of the individual with respect to an associated process plant (e.g., a supervisor, a manager, an engineer, a plant operator, a maintenance personnel, etc.) (block 555), and may execute a user identity data storage module 355 to cause the processor 40 to store a record that is representative of the individual that is attempting access and/or an associated day/time stamp (block 560). For audit purposes, the current biometric data (e.g., an image, a fingerprint, a voice recording, etc.) of the individual may be saved as a record (or "proof") of, for example, which user accesses the process control system.

As described above, the method 500 may comprise a program (or module) for execution by a processor. The program (or module) may be embodied in software stored on a tangible (or non-transitory) computer readable storage medium such as a compact disc read-only memory ("CD-ROM"), a floppy disk, a hard drive, a DVD, Blu-ray disk, or a memory associated with the PED processor. The entire program (or module) and/or parts thereof could alternatively be executed by a device other than the PED processor and/or embodied in firmware or dedicated hardware (e.g., one or more discrete component circuits, one or more application specific integrated circuits (ASICs), etc.). Further, although the example program (or module) is described with reference to the flowchart illustrated in FIG. 5, many other methods of implementing the method 500 may alternatively be used. For example, the order of execution of the blocks may be changed, and/or some of the blocks described may be changed, eliminated, or combined.

As mentioned above, the example processes of FIGS. 4 and 5 may be implemented using coded instructions (e.g., computer-readable instructions) stored on a tangible (e.g., a non-transitory) computer-readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer-readable medium is expressly defined to include any type of computer-readable storage and to exclude propagating signals. Additionally or alternatively, the example processes of FIGS. 4 and 5 may be implemented using coded instructions (e.g., computer-readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The following aspects of the disclosure are exemplary only and not intended to limit the scope of the disclosure.

1. A method for operating a process control system for a process plant, the method comprising: capturing, via a sensor at a user-interface, biometric data of a user authorized to interact with the process control system; comparing the captured biometric data to stored data of users that are authorized to interact with the process control system; determining an identity of a user based on a match between the captured biometric data and the stored data; and providing the user access to the process control system when the identity of the user is determined.

2. The method of aspect 1, wherein the captured biometric data comprises an image including at least a portion of the face of the user, wherein comparing the captured biometric data to stored data comprises: determining one or more facial characteristics of the image; and comparing the one or more facial characteristics to stored data of users authorized to interact with the process control system.

3. The method of aspect 1 or aspect 2, wherein the captured biometric data comprises a voice recording, wherein comparing the captured biometric data to stored data comprises: determining one or more sound characteristics of the voice recording; and comparing the one or more characteristics of the voice recording to stored data of users authorized to interact with the process control system.

4. The method of aspect 3, wherein determining the one or more sound characteristics of the voice recording comprises analyzing one or more of a tone, a pitch, a cadence, or a frequency associated with the voice recording.

5. The method of any one of aspects 1 to 4, wherein allowing access to the process control system includes an input to the user-interface that is a request for an electronic signature, the method further comprising: capturing, via the sensor at the user-interface, an image of the user; determining an arrangement of one or more limbs of the user based on the captured image; and based on the determined arrangement, providing an output signal comprising an electronic signature of the user.

6. The method of any one of aspects 1 to 5, the method further comprising: determining a level of authorization based on the identity of the user; and based on the determined level of authorization, toggling one or more elements of the user-interface.

7. The method of any one of aspects 1 to 6, wherein allowing access to the process control system includes selectively facilitating one or more changes in response to a user input, comprising: enabling one or more components of the user-interface.

8. The method of any one of aspects 1 to 7, wherein allowing access to the process control system includes selectively facilitating one or more changes in response to a user input, comprising: adjusting a setpoint of the process control system.

9. The method of any one of aspects 1 to 8, wherein allowing access to the process control system includes selectively facilitating one or more changes in response to a user input, comprising: configuring a module of the process control system.

10. The method of any one of aspects 1 to 9, wherein allowing access to the process control system includes selectively facilitating one or more changes in response to a user input, comprising: providing an output signal comprising the determined identity of the user.

11. A system for operating a process control system for a process plant, the system comprising: a communication network; one or more processors communicatively coupled to the communication network; and a non-transitory computer-readable memory coupled to the one or more processors and storing thereon instructions that, when executed by the one or more processors, cause the system to: capture, via a sensor at a user-interface, biometric data of a user authorized to interact with the process control system; compare the captured biometric data to stored data of users authorized to interact with the process control system; determine an identity of a user based on a match between the captured biometric data and the stored data; and provide the user access to the process control system when the identity of the user is determined.

12. The system of aspect 11, wherein the captured biometric data comprises an image including at least a portion of the face of the user, wherein the instructions that, when executed by the one or more processors, cause the system to compare the captured the biometric data to stored data comprises: determine one or more facial characteristics of the captured biometric data; and compare the one or more characteristics to stored data of authorized users associated with the process.

13. The system of either aspect 11 or aspect 12, wherein the instructions, when executed by the one or more processors, to selectively facilitate the one or more steps further cause the system to: determine an arrangement of one or more limbs of the user based on the captured biometric data; and based on the determined arrangement, provide an output signal comprising an electronic signature of the user.

14. The system of any one of aspects 11 to 13, wherein the instructions that, when executed by the one or more processors, further cause the system to: capture, via the sensor at the user-interface, a motion associated with the user to; and based on the captured motion, provide an output signal in response to the captured motion.

15. The system of aspect 14, wherein the output signal includes an instruction to log off the user from the user-interface.

16. The system of any one of aspects 11 to 15, wherein the instructions, when executed by the one or more processors, to selectively facilitate the one or more steps further cause the system to enable the user to access the process control system via a user interface.

17. The system of any one of aspects 11 to 16, wherein the instructions, when executed by the one or more processors, further cause the system to activate a user profile based on the determined identity of the user.

18. The system of any one of aspects 11 to 17, wherein the instructions, when executed by the one or more processors, selectively facilitate one or more steps that correspond to a user input and cause the system to adjust a setpoint of the process control system.

19. The system of any one of aspects 11 to 18, wherein the instructions, when executed by the one or more processors, selectively facilitate one or more steps that correspond to a user input and cause the system to: configure a module of the process control system.

20. A tangible, computer-readable medium storing instructions that when executed by one or more processors of a process control system, cause the process control system to: capture, by one or more sensors, biometric data of a user associated with a process of the process control system; determine, by the one or more processors, a level of authorization of the user based on the captured biometric data; and provide the user access to the process control system when the identity of the user is determined.

21. The tangible computer-readable medium of aspect 20, further storing instructions that when executed by one or more processors of a process control system, cause the process control system to: receive, by the one or more processors, an input that corresponds to the process from the user; and based on the determined level of authorization, selectively facilitate, by the one or more processors, one or more steps corresponding to the input.

22. The tangible computer-readable medium of aspect 21, wherein the input that corresponds to the process is a request for an electronic signature, wherein the instructions, when executed by the one or more processors, to selectively facilitate the one or more steps further cause the process control system to: determine, by the one or more processors, an arrangement of one or more limbs of the user based on the captured biometric data; and based on the determined arrangement, provide an output signal comprising an electronic signature of the user.

23. The tangible computer-readable medium of either aspect 21 or aspect 22, wherein the instructions, when executed by the one or more processors, to selectively facilitate the one or more steps that correspond to the input further cause the process control system to: enable the user to access the process control system via a user interface.

24. The tangible computer-readable medium of any one of aspects 21 to 23, wherein the instructions, when executed by the one or more processors, to selectively facilitate the one or more steps that correspond to the input further cause the process control system to: adjust a setpoint of the process control system.

25. The tangible computer-readable medium of any one of aspects 21 to 24, wherein the instructions, when executed by the one or more processors, to selectively facilitate the one or more steps that correspond to the input further cause the process control system to: configure a module of the process control system.

26. A system for operating a process control system for a process plant, the system comprising: a communication network; one or more processors communicatively coupled to the communication network; and a non-transitory computer-readable memory coupled to the one or more processors and storing thereon instructions that, when executed by the one or more processors, cause the system to: capture, via a sensor at a user-interface, first biometric data of a user authorized to interact with the process control system; compare the first biometric data to stored data of users authorized to interact with the process control system; determine an identity of a first user based on a match between the first biometric data and the stored data; capture, via a sensor at a user-interface, second biometric data of a second user authorized to interact with the process control system; determine an arrangement of one or more limbs or a voice signature of the second user based on the captured biometric data; provide an output signal, comprising an electronic signature of the second user, based on the determined arrangement; and provide the first user access to the process control system, based on the output signal, when the identity of the first user is determined.

27. The system of aspect 26, wherein the first biometric data comprises an image including at least a portion of the face of the first user, wherein the first user is a confirmer, and wherein the instructions, when executed by the one or more processors, cause the system to compare the first the biometric data to stored data comprises: determine one or more facial characteristics of the first biometric data; and compare the one or more characteristics to stored data of authorized users associated with the process.

28. The system of either aspect 26 or aspect 27, wherein the instructions that, when executed by the one or more processors, further cause the system to: capture, via the sensor at the user-interface, a motion associated with the second user to; and based on the captured motion, provide the output signal in response to the captured motion, wherein the second user is a verifier.

29. The system of any one of aspects 26 to 28, wherein the output signal includes an instruction to log off the first user from the user-interface.

30. The system of any one of aspects 26 to 29, wherein the instructions, when executed by the one or more processors, cause the system to selectively facilitate the one or more steps, and further cause the system to enable the first user to access the process control system via a user interface.

31. The system of any one of aspects 26 to 30, wherein the instructions, when executed by the one or more processors, further cause the system to activate a user profile based on the determined identity of the first user.

32. The system of any one of aspects 26 to 31, wherein the instructions, when executed by the one or more processors, cause the system to selectively facilitate one or more steps that correspond to a user input and cause the system to adjust a setpoint of the process control system.

33. The system of any one of aspects 26 to 32, wherein the instructions, when executed by the one or more processors, cause the system to selectively facilitate one or more steps that correspond to a user input and cause the system to: configure a module of the process control system.

While various functions and/or systems of field devices have been described herein as "modules," "components," or "function blocks," it is noted that these terms are not limited to single, integrated units. Moreover, while the present invention has been described with reference to specific examples, those examples are intended to be illustrative only, and are not intended to limit the invention. It will be apparent to those of ordinary skill in the art that changes, additions or deletions may be made to the disclosed embodiments without departing from the spirit and scope of the invention. For example, one or more portions of methods described above may be performed in a different order (or concurrently) and still achieve desirable results.

What is claimed is:

1. A method for operating a process control system for an industrial process plant, the method comprising:
    capturing, via a sensor at a user-interface, biometric data of a user authorized to interact with the process control system;
    comparing the captured biometric data to stored data of users that are authorized to interact with the process control system;
    determining an identity of a user based on a match between the captured biometric data and the stored data;
    providing the user access to the process control system, via at least one of a batch operator interface or a campaign manager, when the identity of the user is determined, wherein access to the process control system includes enabling the user to perform at least one secured operation selected from the group of: configuration of a field device within the process control system, monitoring of a field device within the process control system, or control of a field device within the process control system, wherein the field device is at least one of: a sensor, a valve, a regulator, a transmitter, or a positioner, and wherein the field device measures a process variable within the process plant and/or performs a physical function within the process plant based on a measured process variable within the process plant;
    saving the captured biometric data and an indication of the action performed along with a day and time stamp in response to providing the user access to the process control system, wherein the saved captured biometric data, the indication of the action performed, and the day and time stamp provide a record of which user accesses the process control system, which action was performed, and a day and time when the user accesses the process control system;
    capturing, via the sensor at the user-interface, current biometric data of a changed user;
    comparing the current biometric data to the captured biometric data;
    determining a change in user based on a difference between the current biometric data and the captured biometric data; and
    preventing the changed user from performing a secured operation within the process control system.

2. The method of claim 1, wherein the captured biometric data comprises an image including at least a portion of the face of the user, wherein comparing the captured biometric data to stored data comprises:
    determining one or more facial characteristics of the image; and
    comparing the one or more facial characteristics to stored data of users authorized to interact with the process control system.

3. The method of claim 1, wherein the captured biometric data comprises a voice recording, wherein comparing the captured biometric data to stored data comprises:
    determining one or more sound characteristics of the voice recording; and
    comparing the one or more characteristics of the voice recording to stored data of users authorized to interact with the process control system.

4. The method of claim 1, further comprising:
    denying the user access to the process control system when the captured biometric data is determined to not match the stored data; and
    saving the captured biometric data along with a day and time stamp in response to denying the user access to the process control system, wherein the saved captured biometric data and the day and time stamp provide a record of which user is denied access to the process control system and a day and time when the user is denied access to the process control system.

5. The method of claim 1, wherein allowing access to the process control system includes an input to the user-interface that is a request for an electronic signature, the method further comprising:
    capturing, via the sensor at the user-interface, an image of the user;
    determining an arrangement of one or more limbs of the user based on the captured image; and
    based on the determined arrangement, providing an output signal comprising an electronic signature of the user.

6. The method of claim 1, the method further comprising:
    determining a level of authorization based on the identity of the user; and
    based on the determined level of authorization, toggling one or more elements of the user-interface and save a record of the level of authorization of the user.

7. The method of claim 1, wherein allowing access to the process control system includes selectively facilitating one or more changes in response to a user input, comprising:
    enabling one or more components of the user-interface.

8. The method of claim 1, wherein allowing access to the process control system includes selectively facilitating one or more changes in response to a user input, comprising:
    adjusting a setpoint of the process control system.

9. The method of claim 1, wherein allowing access to the process control system includes selectively facilitating one or more changes in response to a user input, comprising:
    configuring a module of the process control system.

10. The method of claim 1, wherein allowing access to the process control system includes selectively facilitating one or more changes in response to a user input, comprising:
    providing an output signal comprising the determined identity of the user.

11. A system for operating a process control system for an industrial process plant, the system comprising:
    a communication network;
    one or more processors communicatively coupled to the communication network; and a non-transitory computer-readable memory coupled to the one or more processors and storing thereon instructions that, when executed by the one or more processors, cause the system to:
    capture, via a sensor at a user-interface, biometric data of a user authorized to interact with the process control system;
    compare the captured biometric data to stored data of users authorized to interact with the process control system;
    determine an identity of a user based on a match between the captured biometric data and the stored data;
    provide the user access to the process control system, via at least one of a batch operator interface or a campaign manager, when the identity of the user is determined, wherein access to the process control system includes enabling the user to perform at least one secured operation selected from the group of: configuration of a field device within the process control system, monitoring of a field device within the process control system, or control of a field device within the process control system, wherein the field device is at least one of: a sensor, a valve, a regulator, a transmitter, or a positioner, and wherein the field device measures a process variable within the process plant and/or performs a physical function within the process plant based on a measured process variable within the process plant;

save the captured biometric data and an indication of the action performed along with a day and time stamp in response to providing the user access to the process control system, wherein the saved captured biometric data, the indication of the action performed, and the day and time stamp provide a record of which user accesses the process control system, which action was performed, and a day and time when the user accesses the process control system;

capture, via the sensor at the user-interface, current biometric data of a changed user;

compare the current biometric data to the captured biometric data;

determine a change in user based on a difference between the current biometric data and the captured biometric data; and prevent the changed user from performing a secured operation within the process control system.

12. The system of claim 11, wherein the captured biometric data comprises an image including at least a portion of the face of the user, wherein the instructions that, when executed by the one or more processors, cause the system to compare the captured the biometric data to stored data comprises:

determine one or more facial characteristics of the captured biometric data; and compare the one or more characteristics to stored data of authorized users associated with the process.

13. The system of claim 11, wherein the instructions, when executed by the one or more processors, to selectively facilitate the one or more steps further cause the system to:

determine an arrangement of one or more limbs of the user based on the captured biometric data; and based on the determined arrangement, provide an output signal comprising an electronic signature of the user.

14. The system of claim 11, wherein the instructions that, when executed by the one or more processors, further cause the system to:

capture, via the sensor at the user-interface, a motion associated with the user to; and based on the captured motion, provide an output signal in response to the captured motion.

15. The system of claim 14, wherein the output signal includes an instruction to log off the user from the user-interface.

16. The system of claim 11, wherein the instructions, when executed by the one or more processors, to selectively facilitate the one or more steps further cause the system to enable the user to access the process control system via a user interface.

17. The system of claim 11, wherein the instructions, when executed by the one or more processors, further cause the system to activate a user profile based on the determined identity of the user.

18. The system of claim 11, wherein the instructions, when executed by the one or more processors, selectively facilitate one or more steps that correspond to a user input and cause the system to adjust a setpoint of the process control system.

19. The system of claim 11, wherein the instructions, when executed by the one or more processors, selectively facilitate one or more steps that correspond to a user input and cause the system to:

configure a module of the process control system.

20. A tangible, computer-readable medium storing instructions that when executed by one or more processors of a process control system, cause the process control system to:

capture, by one or more sensors, biometric data of a user associated with a process of the process control system;

determine, by the one or more processors, a level of authorization of the user based on the captured biometric data;

provide the user access to the process control system, via at least one of a batch operator interface or a campaign manager, when the identity of the user is determined, where access to the process control system includes enabling the user to perform at least one secured operation selected from the group of: configuration of a field device within the process control system, monitoring of a field device within the process control system, or control of a field device within the process control system, wherein the field device is at least one of: a sensor, a valve, a regulator, a transmitter, or a positioner, and wherein the field device measures a process variable within the process plant and/or performs a physical function within the process plant based on a measured process variable within the process plant;

save an indication of the action performed, the level of authorization of the user and the captured biometric data along with a day and time stamp in response to providing the user access to the process control system, wherein the saved captured biometric data, the indication of the action performed, and the day and time stamp provide a record of which user accesses the process control system, which action was performed, and a day and time when the user accesses the process control system;

capture, via the sensor at the user-interface, current biometric data of a changed user;

compare the current biometric data to the captured biometric data; and determine a change in user based on a difference between the current biometric data and the captured biometric data; and prevent the changed user from performing a secured operation within the process control system.

21. The tangible computer-readable medium of claim 20, further storing instructions that when executed by one or more processors of a process control system, cause the process control system to:

receive, by the one or more processors, an input that corresponds to the process from the user; and based on the determined level of authorization, selectively facilitate, by the one or more processors, one or more steps corresponding to the input.

22. The tangible computer-readable medium of claim 21, wherein the input that corresponds to the process is a request for an electronic signature, wherein the instructions, when executed by the one or more processors, to selectively facilitate the one or more steps further cause the process control system to:
  determine, by the one or more processors, an arrangement of one or more limbs of the user based on the captured biometric data; and
  based on the determined arrangement, provide an output signal comprising an electronic signature of the user.

23. The tangible computer-readable medium of claim 21, wherein the instructions, when executed by the one or more processors, to selectively facilitate the one or more steps that correspond to the input further cause the process control system to:
  enable the user to access the process control system via a user interface.

24. The tangible computer-readable medium of claim 21, wherein the instructions, when executed by the one or more processors, to selectively facilitate the one or more steps that correspond to the input further cause the process control system to:
  adjust a setpoint of the process control system.

25. The tangible computer-readable medium of claim 21, wherein the instructions, when executed by the one or more processors, to selectively facilitate the one or more steps that correspond to the input further cause the process control system to:
  configure a module of the process control system.

26. A system for operating a process control system for an industrial process plant, the system comprising:
  a communication network;
  one or more processors communicatively coupled to the communication network; and a non-transitory computer-readable memory coupled to the one or more processors and storing thereon instructions that, when executed by the one or more processors, cause the system to:
  capture, via a sensor at a user-interface, first biometric data of a user authorized to interact with the process control system;
  compare the first biometric data to stored data of users authorized to interact with the process control system;
  determine an identity of a first user based on a match between the first biometric data and the stored data;
  capture, via a sensor at a user-interface, second biometric data of a second user authorized to interact with the process control system;
  determine an arrangement of one or more limbs or a voice signature of the second user based on the captured biometric data;
  provide an output signal, comprising an electronic signature of the second user, based on the determined arrangement;
  provide the first user access to the process control system, via at least one of a batch operator interface or a campaign manager and based on the output signal, when the identity of the first user is determined, where access to the process control system includes enabling the first user to perform at least one secured operation selected from the group of: configuration of a field device within the process control system, monitoring of a field device within the process control system, or control of a field device within the process control system, wherein the field device is at least one of: a sensor, a valve, a regulator, a transmitter, or a positioner, and wherein the field device measures a process variable within the process plant and/or performs a physical function within the process plant based on a measured process variable within the process plant;
  save at least one of: the first biometric data or the second biometric data and an indication of the action performed, along with a day and time stamp, in response to providing the first user access to the process control system, wherein the saved first biometric data or the saved second biometric data, the indication of the action performed, and the day and time stamp, provide a record of which user accesses the process control system, which action was performed, and a day and time when the user accesses the process control system;
  capture, via the sensor at the user-interface, current biometric data of a changed user;
  compare the current biometric data to the captured biometric data; and
  determine a change in user based on a difference between the current biometric data and the captured biometric data; and
  prevent the changed user from performing a secured operation within the process control system.

27. The system of claim 26, wherein the first biometric data comprises an image including at least a portion of the face of the first user, wherein the first user is a confirmer, and wherein the instructions, when executed by the one or more processors, cause the system to compare the first the biometric data to stored data comprises:
  determine one or more facial characteristics of the first biometric data; and
  compare the one or more characteristics to stored data of authorized users associated with the process.

28. The system of claim 26, wherein the instructions that, when executed by the one or more processors, further cause the system to:
  capture, via the sensor at the user-interface, a motion associated with the second user to; and
  based on the captured motion, provide the output signal in response to the captured motion, wherein the second user is a verifier.

29. The system of claim 26, wherein the output signal includes an instruction to log off the first user from the user-interface.

30. The system of claim 26, wherein the instructions, when executed by the one or more processors, cause the system to selectively facilitate the one or more steps, and further cause the system to enable the first user to access the process control system via a user interface.

31. The system of claim 26, wherein the instructions, when executed by the one or more processors, further cause the system to activate a user profile based on the determined identity of the first user.

32. The system of claim 26, wherein the instructions, when executed by the one or more processors, cause the system to selectively facilitate one or more steps that correspond to a user input and cause the system to adjust a setpoint of the process control system.

33. The system of claim 26, wherein the instructions, when executed by the one or more processors, cause the system to selectively facilitate one or more steps that correspond to a user input and cause the system to:
  configure a module of the process control system.

* * * * *